R. F. RUMANS.
SEPARABLE CONNECTION FOR CHECKREINS.
APPLICATION FILED APR. 14, 1913.
1,085,164. Patented Jan. 27, 1914.
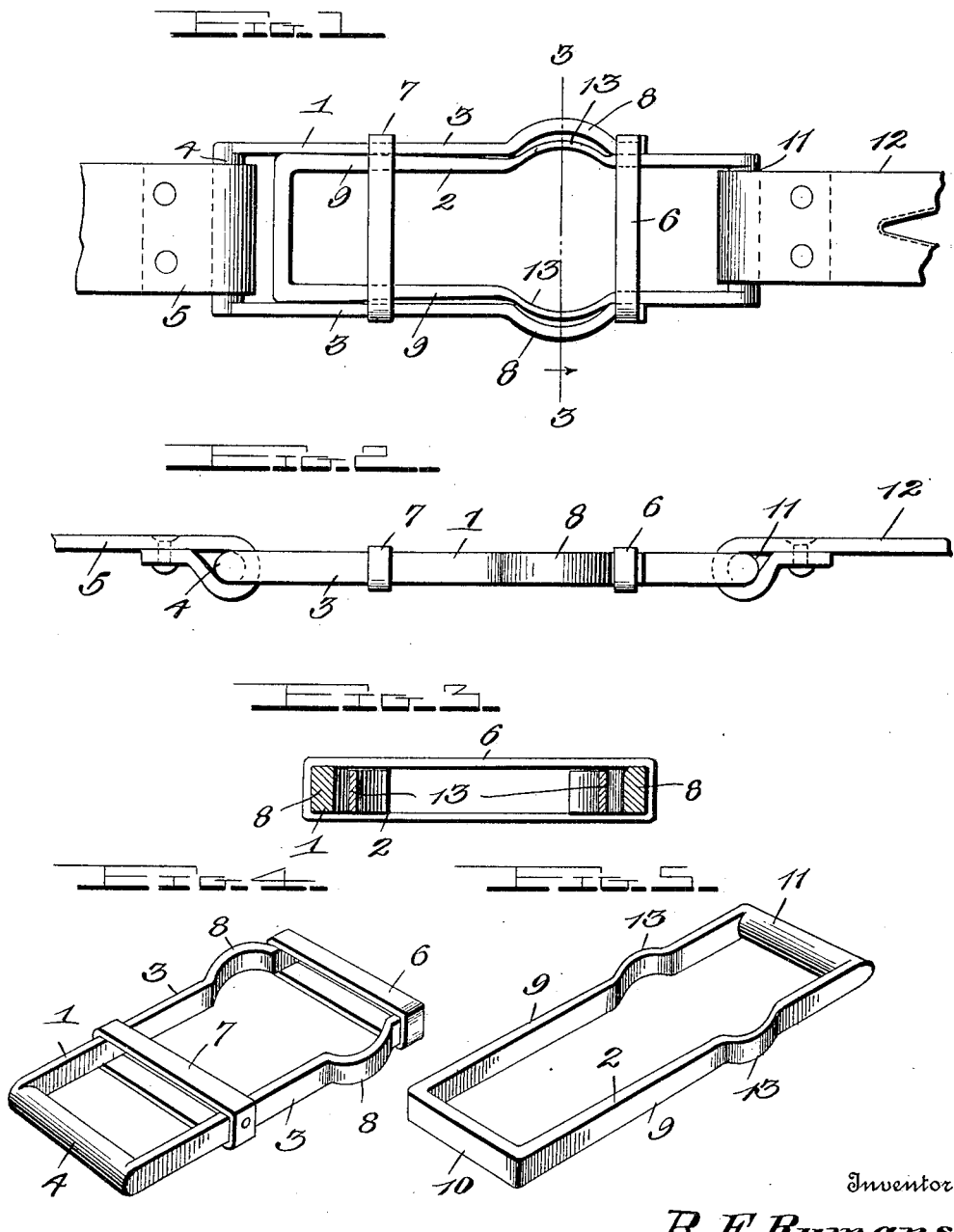
Inventor
R. F. Rumans,
Witnesses

UNITED STATES PATENT OFFICE.

ROY F. RUMANS, OF CLARK, MISSOURI.

SEPARABLE CONNECTION FOR CHECKREINS.

1,085,164.   Specification of Letters Patent.   Patented Jan. 27, 1914.

Application filed April 14, 1913. Serial No. 761,018.

*To all whom it may concern:*

Be it known that I, ROY F. RUMANS, a citizen of the United States, residing at Clark, in the county of Randolph and State of Missouri, have invented certain new and useful Improvements in Separable Connections for Checkreins; and I do declare the following to be a full, clear, and exact description of the invention, such as will enable others skilled in the art to which it appertains to make and use the same.

This invention relates to improvements in separable connections for check reins.

One object of the invention is to provide an improved connection for overdraw check reins formed in sections which are adapted to pull apart when sufficient strain is brought thereon, thus preventing the check rein from being broken when the animal to which it is applied falls or stumbles.

Another object is to provide a device of this character which will be simple, strong, durable and inexpensive in construction, efficient and reliable in operation and in which the parts may be readily reassembled after being separated.

With these and other objects in view, the invention consists of certain novel features of construction, and the combination and arrangement of parts as will be more fully described and claimed.

In the accompanying drawings: Figure 1 is a plan view of my improved separable connection for check reins showing the parts engaged and connected with the ends of the check rein; Fig. 2 is a side view thereof; Fig. 3 is a cross sectional view taken on the line 3—3 of Fig. 1; Fig. 4 is a detail perspective view of the outer member of the connection; Fig. 5 is a similar view of the inner member of the connection.

My improved separable connection for check reins comprises an outer bail shaped section or member 1 and an inner rectangular loop shaped section or member 2. The outer member 1 comprises parallel side bars 3 which are connected at one end by an integral cross bar 4. The side bars 3 of the member 1 are preferably flat or rectangular in cross section while the end bar 4 is rounded to prevent cutting of the check rein strap 5 which is connected thereto in any suitable manner. The ends of the side bars 3 are connected by a metal loop 6, a similar loop 7 being arranged around and secured to the side bars at a point intermediate their ends as shown. The loops 6 and 7 are provided to brace and prevent spreading of the side bars 3 of the member 1. In the side bars 3 near their ends are formed outwardly projecting curved bends 8 which provide recesses on the inner sides of the bars 3 for a purpose hereinafter described. The inner member 2 of the connection also comprises parallel side bars 9 one of the ends of which are integrally connected with an inner end cross bar 10 while the opposite ends are integrally connected with an outer end cross bar 11. The outer end cross bar is preferably rounded to prevent cutting of the strap loop or eye 12 which is connected therewith and is adapted to be engaged with the check hook of the harness. The side bars 9 and inner end cross bar 10 are preferably formed of a strip of flat or rectangular metal and the side bars 9 are resilient and have formed therein near their outer ends outwardly curved bends which form offset cams 13 and which if desired may be somewhat thinner than the main portion of the bars as shown.

The members or sections 1 and 2 of the connection may be of any suitable length and width and the outside width of the member 2 corresponds with the inside width of the member 1 between the side bars of which the member 2 is adapted to be inserted when the parts are in operative engagement. When the members 1 and 2 are connected for operation the cam projections 13 are sprung into the recesses formed by the bends 8 in the side bars of the member 1 as clearly shown in Fig. 1 of the drawings. When the parts are thus connected they will be held together and prevented from being pulled apart by any ordinary strain applied thereto through the check rein strap. When however, the check rein is subjected to such strain by the stumbling or falling of the animal as would break the check rein strap, the resiliency of the side bars 9 will permit the cam projections 13 to give inwardly and thus become disengaged from the recesses formed by the bends 8 in the outer member of the connection whereupon said members will pull apart, thus preventing the breaking of the check rein strap or of the hook loop 12. When it is again desired to connect the members or sections 1 and 2 it is simply necessary to insert the inner end of the section 2 between the side bars of the section 1 and to force the sections together thereby springing the cam projections 13 into the recesses formed by the bends 8 as will be readily understood. When the parts are assembled or operatively connected, the inner portion of the member 2 will be guided and held in position between the side bars 3 of the member 1 by the bracing loops 7, while the outer portion of the member 2 will be held in position by the outer loop 6.

From the foregoing description taken in connection with the accompanying drawings, the construction and operation of the invention will be readily understood without requiring a more extended explanation.

Various changes in the form, proportion and minor details of construction may be resorted to without departing from the principle or sacrificing any of the advantages of the invention as claimed.

Having thus described my invention, what I claim is:

In a separable connection for check reins, an outer member and an inner member, said outer member comprising parallel side bars and a cross bar connecting the same at one end, brace loops engaged with said bars at their free ends and at a point intermediate their ends whereby said bars are rigidly spaced, the side bars of said outer member having outwardly curved bends adjacent to their ends, said inner member comprising a rectangular shaped loop adapted to be snugly but freely received by the outer member between the side bars thereof, the opposite parallel bars of said member being resilient throughout their entire length and provided with outwardly projecting curved bends which form cam projections adapted to be sprung into engagement with the recesses formed in the bends in the side bars of the outer member when said members are assembled whereby the same are held in detachable engagement.

In testimony whereof I have hereunto set my hand in presence of two subscribing witnesses.

ROY F. RUMANS.

Witnesses:
W. E. BROWN,
STEPHEN OWINGS.

Copies of this patent may be obtained for five cents each, by addressing the "Commissioner of Patents, Washington, D. C."